July 17, 1962 P. R. KIPPUR 3,045,044
CHLORO (2-CHLOROVINYL) ALKYLBORANES AND THEIR PREPARATION
Filed Jan. 28, 1959
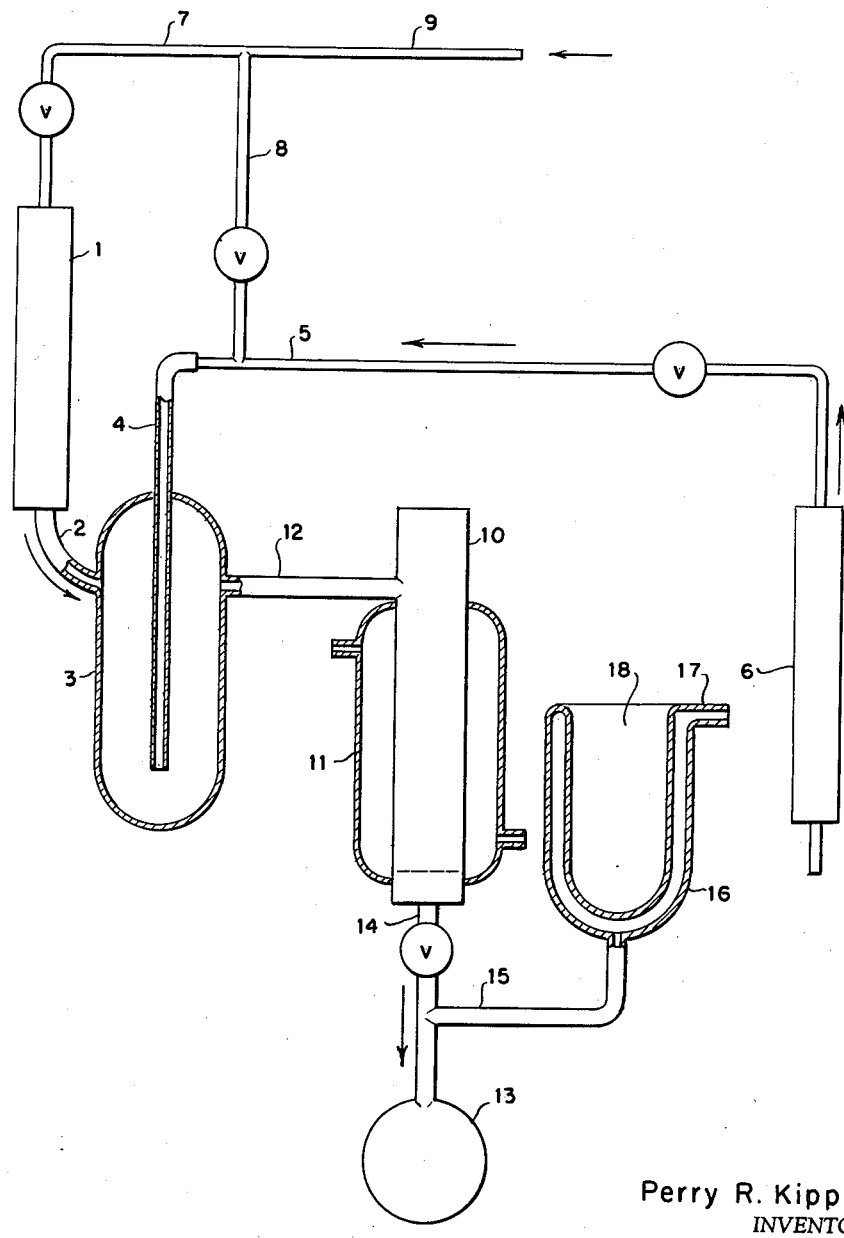
Perry R. Kippur
INVENTOR.
BY
Adams, Forward and McLean
ATTORNEYS 3,045,044
CHLORO(2-CHLOROVINYL)ALKYLBORANES
AND THEIR PREPARATION
Perry R. Kippur, Hamden, Conn., assignor to Olin Mathieson Chemical Corporation, a corporation of Virginia
Filed Jan. 28, 1959, Ser. No. 789,741
6 Claims. (Cl. 260—543)

This invention relates to the preparation of chloro (2-chlorovinyl) alkylboranes.

By the process of this invention, chloro(2-chlorovinyl) alkylboranes wherein the alkyl group contains 1 to 5 carbon atoms are obtained by contacting activated carbon with acetylene and an alkyldichloroborane, wherein the alkyl group contains 1 to 5 carbon atoms. Suitable alkyldichloroboranes, such as methyldichloroborane, ethyldichloroborane, n-propyldichloroborane, isopropyldichloroborane, n-butyldichloroborane, and n-amyldichloroborane, can be prepared according to the method described by Booth and Kraus in J. Am. Chem. Soc., volume 74, pages 1415–1417 (1952). The chemical reaction which takes place when this process is carried out with ethyldichloroborane can be represented by the following equation:

$$C_2H_5BCl_2 + C_2H_2 = (ClCH=CH)(C_2H_5)BCl$$

The reaction temperature can be varied widely from about 40° to about 115° C., while the preferred temperature range is from 60°–105° C. Temperatures above 115° C. must be avoided since at these temperatures chloro(2-chlorovinyl)ethylborane, for example, disproportionates to give equimolar quantities of ethyldichloroborane and bis-(2-chlorovinyl)ethylborane. In a like manner, the molar ratio of acetylene to alkyldichloroborane can also be varied through a wide range of from about 0.3:1 to 10:1, preferably 0.5:1 to 3:1. The activated carbon utilized can be derived from, for example, wood, peat, lignite, nut shells, bones and so forth.

Chloro(2-chlorovinylalkylboranes are useful chemical compounds in that they can be converted to dialkylchloroboranes as described in the application of Clark et al., Serial Number 789,742, filed of even date herewith and entitled Manufacture. Thus according to Serial No. 789,-742, a chloro(2-chlorovinylalkylborane is hydrogenated with molecular hydrogen in the presence of a palladium catalyst at a temperature of from 20° to 160° C. and at a pressure of from 0 p.s.i.g. to 50 p.s.i.g. to form the corresponding ethylalkylchloroborane. Application Serial No. 789,742 further discloses reaction of an ethylalkylchloroborane with tris(2-chlorovinyl)borane to form the corresponding (2-chlorovinyl) ethylalkylborane which in turn can be hydrogenated according to the method described in Serial No. 789,742 to produce a diethylalkylborane. The latter trialkylboranes can be utilized to prepare diborane as described in Klein et al. application Serial No. 614,768, now U.S. Patent 2,946,664. The following examples illustrate in detail the method of the invention.

EXAMPLE 1

The apparatus employed in this example is shown in FIGURE 1. It consisted of a stainless steel ethyldichloroborane reservoir 1 of 200 cc. capacity connected at the bottom by means of line 2 to a saturator vessel 3 which had a capacity of about 100 cc. Saturator vessel 3 was equipped with a dip leg 4 through which acetylene was led into the saturator by means of line 5 containing rotameter 6. Inlets 7 and 8 for the introduction of nitrogen from line 9 into the top of reservoir 1 and into line 5 to saturator 3 respectively were also provided. Reactor 10 which was a glass tube 30 inches in length and 1 inch (I.D.) containing a sintered glass disk as a catalyst support, was provided with a jacketed section 11 about 24 inches in length for heating or cooling as desired. The upper or inlet end of reactor 10 was connected to saturator 3 by line 12 while the outlet of reactor 10 was connected to a 500 cc. glass collection flask 13 by line 14. Also connected to line 14 by line 15 was attached a "cold finger" type condenser 16 having a vent 17 and a hollow space 18 into which was placed a Dry Ice-acetone mixture at −78° C. The condenser was arranged in such a manner that condensate leaving the condenser flowed downwardly into collection flask 13.

In this experiment, the reactor was charged with 150 cc. of activated carbon of 4–6 mesh size. A weighed quantity of ethyldichloroborane was charged to reservoir 1 in a dry box. The reactor system was assembled as shown in FIGURE 1 and after the catalyst bed had been heated to a temperature of 100° C. by introducing steam into the reactor jacket, nitrogen was passed through the bed for a period of several hours in order to remove absorbed water from the carbon. The flow of nitrogen was stopped and acetylene at the rate of 50 cc./min. at S.T.P. (.00223 mole/min.) was passed by way of line 5 and dip leg 4 into saturator 3 while ethyldichloroborane was passed by way of line 2 to the saturator at the rate of .00149 mole/min. The temperature of heating jacket 11 was maintained at 100° C. As soon as the carbon had been completely saturated, liquid product consisting of chloro(2-chlorovinyl)ethylborane and unconverted ethyldichloroborane was obtained. Non-condensible gases were vented through vent 17. After 13 hours, the flow of reactants was stopped, vent 17 was connected to a bubble-off, and the entire system placed under a positive pressure of nitrogen.

The crude product, which collected in the product receiver, was analyzed by infrared and by elemental analysis. In this experiment, the average percent conversion to chloro(2-chlorovinyl)ethylborane was 75 percent and the percent yield was greater than 90.

Pure chloro(2-chlorovinyl)ethylborane can be recovered from the crude product by means of vacuum distillation carried out under a pressure of not over 35 mm. of mercury absolute. Since the product is pyrophoric, nitrogen should be used to control and relieve the vacuum in this distillation operation.

EXAMPLES 2–6

The data from a number of additional experiments, in which activated carbon of the same type was used, are set forth in Table 1. In Examples 2 and 3, where an excess of ethyldichloroborane was employed, a liquid feed pump which discharged into the top of the reactor was substituted for the saturator and the acetylene inlet line was attached directly to the top of the reactor. With this exception, the apparatus employed in Examples 2–6 and the method of operation were the same as that described in Example 1.

*Table 1*

| Example | Jacket Temp., °C. | Catalyst Vol., cc. | Mole, $C_2H_2$/min. | Mole Ratio, $C_2H_5BCl_2$/$C_2H_2$ | Rate $C_2H_2$, cc./min. | Total hours of Run | Av. percent Conv. $C_2H_2$ | Percent Yield |
|---|---|---|---|---|---|---|---|---|
| 2 | 100 | 300 | 0.00415 | 2/1 | 93 | 33 | 25.6 | 90 |
| 3 | 100 | 900 | 0.00415 | 2/1 | 93 | 29 | 37.1 | 90 |
| 4 | 100 | 150 | 0.00446 | 1/1.5 | 100 | 11 | 36.4 | 90 |
| 5 | 70 | 150 | 0.00446 | 1/1.5 | 100 | 11.25 | 38.0 | 90 |
| 6 | 130 | 150 | 0.00446 | 1/1.5 | 100 | 17.5 | 47 | ca. 50 |

NOTE.—In Example 6, the low yield is due to disproportionation of chloro(2-chlorovinyl)ethylborane to give equimolar quantities of ethyldichloroborane and bis(2-chlorovinyl)ethylborane. This disproportionation occurs at a temperature above about 115° C. Therefore, 115° C. is the practical temperature limit for carrying out this reaction.

It is claimed:
1. Chloro(2-chlorovinyl) alkylboranes of the formula $$(ClCH=CH)RBCl$$

wherein R is an alkyl group containing from 1 to 5 carbon atoms.

2. Chloro(2-chlorovinyl)ethylborane of the formula $$(ClCH=CH)(C_2H_5)BCl$$

3. A method for the preparation of chloro(2-chlorovinyl)alkylboranes which comprises reacting acetylene and an alkyldichloroborane wherein the alkyl group contains from 1 to 5 carbon atoms at a temperature within the range from about 40° to about 115° C. while the reactants are in contact with a catalyst consisting essentially of activated carbon.

4. The method of claim 3 wherein the molar ratio of acetylene to alkyldichloroborane introduced into the reaction zone is within the range from 0.3:1 to 10:1.

5. The method of claim 3 wherein the alkyldichloroborane is ethyldichloroborane.

6. The method of claim 5 wherein the molar ratio of acetylene to dichloroethylborane introduced into the reaction zone is within the range from 0.5:1 to 3:1.

References Cited in the file of this patent

UNITED STATES PATENTS 2,402,589    Arnold                June 25, 1946

UNITED STATES PATENT OFFICE
CERTIFICATE OF CORRECTION

Patent No. 3,045,044                          July 17, 1962

Perry R. Kippur

It is hereby certified that error appears in the above numbered patent requiring correction and that the said Letters Patent should read as corrected below.

Column 1, line 40, for "Chloro(2-chlorovinylalkylboranes" read -- Chloro(2-chlorovinyl)alkylboranes --; line 45, for "chloro(2-chlorovinylalkylborane" read -- chloro(2-chlorovinyl)alkylborane --; line 64, for "200 cc." read -- 2000 cc. --.

Signed and sealed this 20th day of November 1962.

(SEAL)
Attest:

ERNEST W. SWIDER
Attesting Officer

DAVID L. LADD
Commissioner of Patents